Dec. 21, 1948.  H. A. ALTER  2,456,667
ELECTRICAL MEASURING INSTRUMENT
Filed Feb. 7, 1944  2 Sheets-Sheet 1

INVENTOR
HARRY A. ALTER,
BY
Toulmin & Toulmin
ATTORNEYS

Dec. 21, 1948. H. A. ALTER 2,456,667
ELECTRICAL MEASURING INSTRUMENT
Filed Feb. 7, 1944 2 Sheets-Sheet 2

INVENTOR
HARRY A. ALTER,
BY
Toulmin & Toulmin
ATTORNEYS

Patented Dec. 21, 1948

2,456,667

UNITED STATES PATENT OFFICE 2,456,667

ELECTRICAL MEASURING INSTRUMENT

Harry A. Alter, Dayton, Ohio, assignor to The W. W. Boes Company, Dayton, Ohio, a corporation of Ohio Application February 7, 1944, Serial No. 521,343

7 Claims. (Cl. 171—95)

The present invention relates to electric measuring instruments and particularly voltmeters of the soft iron moving vane.

In instruments of this character, for example those of the Weston type, it has been customary to employ a relatively long pointer shaft or pivot which extends through the thickness of the coil. The presence of this shaft within the coil offers the three disadvantages:

(1) It tends to cause the space within the coil to be congested and in extreme cases may actually interfere with the free movement of the soft iron vane.

(2) The long shaft tends to give a high column effect with consequent excessive wear on the lower bearing which absorbs the thrust.

(3) A certain, not entirely negligible current, may be induced in the shaft by the surrounding coil and thus uselessly absorb the magnetic energy of the coil which otherwise could have been imparted to the movable vane.

The primary object of the invention is to provide an improved instrument in which all parts of the pointer, pivot or shaft are removed from the coil so as not to incur any of the disadvantages set forth hereinbefore. This object is attained in brief and in accordance with the present invention by employing a foreshortened pointer shaft and in which the lower end of the shaft is supported from a plate extending across the upper portion of the instrument, and which carries a depending bearing positioned above the coil.

In most types of the moving vane form of instrument, the adjustability is effected chiefly by reason of the zero-set screw and it has been found that the operation of this screw does not give sufficient control over the movement of the pointer and therefore does not provide the necessary close calibration.

In accordance with another principal object of the invention, I provide an additional adjustment arrangement or accessory by which the movement of the pointer can be controlled and if necessary calibrated without affecting its zero-set position. The invention contemplates the use of a stationary vane, the position of which, with respect to the coil, can be readily adjusted from the exterior of the instrument.

Other objects and features will be apparent as the following specification is perused in connection with the accompanying drawings in which:

Fig. 4 is a plan view of the coil, in diminutive, and associated magnetic parts while

Figures 1, 2:
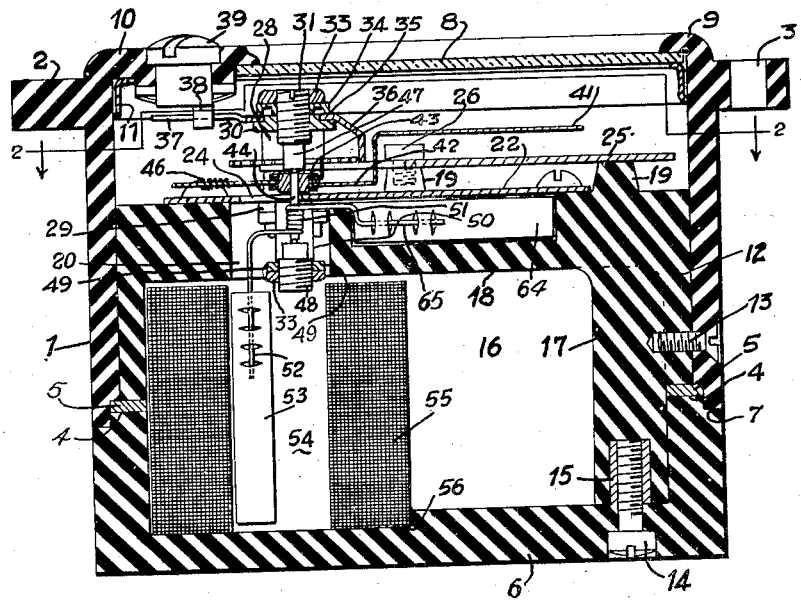
Figure 1 is a vertical sectional view taken through the improved instrument.
Figure 2 is a transverse sectional view of the same instrument taken along line 2—2 in Figure 1.

Referring more particularly to Figures 1 and 2, reference character 1 designates a cylindrical casing made of any suitable insulating material such as a phenolic condensation product such as Bakelite or may be made of hard rubber and provided at its upper edge with an outwardly extending flange 2. There may be provided a plurality of openings 3 about the flange by which to secure the casing to a panel or switchboard.

The lower edge of the casing is provided with a counterbored ledge 4 for receiving a washer 5, preferably of a non-magnetic material, and abutting this washer there is a flanged closure plate 6 provided with a recess indicated at 7 into which the casing 1 snugly fits. The lower end of the casing as a whole is closed by the plate 6.

The upper end of the casing is open to receive a window 8, this window being so positioned as to abut a lip 9 formed on the casing. This lip is extended about the upper edge of the casing and may merge into a relatively wide overhanging ledge 10 shown at the upper left-hand corner of Figure 1. The window 8 is held in position against the lip and ledge by a spring band 11.

The interior mechanism, including the pointer and instrument movement, etc. is carried on a cylinder member 12, preferably of the same material as the casing and which fits snugly within the latter. A screw 13 extending transversely of the casing may be threaded into the member 12. The closure plate 6 is held in position against the casing 1 by means of a screw 14 passing through the plate and which is threaded in a metal sleeve 15 carried by the member 12. Thus, by removing the screws 13 and 14, all of the internal parts within the casing 1 may be removed from the casing for inspection or replacement.

The lower edge of the member 12 sets on the washer 5. This member is actually in the form of a ring to provide a large recess 16. The interior surface of this ring is not entirely cylindrical, but instead there may be provided a lug or lugs indicated at 17 which extend inwardly to give extra material at those places at which the screws 13 and 14 are located. These lugs extend all the way down to the inner surface of the closure plate. The upper end of the member 12 is formed with a horizontally extending wall 18 provided with a plurality of upstanding bosses 19, of which two have been illustrated in Figure 2. This wall portion also contains an opening therethrough indicated at 20 for receiving parts of the instrument movement.

There is a cavity 21 of segmental shape also provided in the wall portion, this cavity being closed at the bottom but open at the top. The purpose of this recess will be pointed out hereinafter.

A plate 22, preferably of a non-magnetic metal, such as aluminum, is secured by screws 23 to the upper surface of the wall portion 18, this plate being provided with an opening 24 through which the instrument movement extends. The plate 22 constitutes the main supporting element for the movement. There is a dial plate 25 which rests on the bosses 19, and is screwed to two of the bosses as indicated at 26. The dial plate has cut-away portions 27 in order to clear the instrument and pointer movement.

A pair of rod uprights (not shown) surrounded by sleeves 28 extend upwardly from the support plate 22, these uprights being secured thereto in any suitable manner, for example by means of nuts 29. A bar bridge 30 is secured at each end to the rod uprights as shown in Figure 2, this bridge serving as a support for the upper portion of the instrument movement. The bridge is provided at its middle with a tapped hole for receiving a headless set screw 31 which contains a jewel bearing for journalling the upper end of the pivot. This set screw is locked in position by means of a nut 33 resting on a washer 34. The bridge 30 is provided at its middle with an upstanding ledge 35 of circular configuration to serve as a pivot bearing for a metal strap 36 having a bifurcated end 37. A pin 38 is located between the furcations of the strap or arm 36, this pin being carried by the lower end of a zero-set screw 39 which is rotatably mounted in any suitable and well known manner about the ledge 10. Thus, by rotating the screw 39, the arm 36 can be rotated at the swivel joint provided on the bar member.

The opposite or lower end of the arm 36 is secured to the outer end of a torsional spring 40 and the inner end of the spring 40 is connected in any suitable manner to the swingable pointer which will now be described.

The pointer 41 is provided with an offset portion 42 and this portion is carried by a small cylindrical member 43 which is tightly secured to a pivot shaft 44 extending upwardly through the cylindrical member 43. Opposite from the pointer end there is a rod 45 carrying one or more counterweights 46 for balancing the weight of the pointer (Figure 2).

The shaft or spindle 44 is pivoted at its upper end in a reduced diameter portion 47 of the set screw 31 which contains the jewel bearing. The lower end of the spindle 44 rests on and is carried by a jewel bearing contained in a set screw 48 which is threaded and locked in position on a lower bar bridge 49 having upwardly extending arms 50 which are secured in any suitable manner to the lower surface of the plate 22. The spindle 44 is adapted to turn on the jewel bearings which reduce friction to a minimum.

There is a wire coil 51 passing around the shaft 44 and wound so tightly as to be fixed to the shaft. The lower end of the coil is brought out to a downwardly extending rod 52 which is threaded in any suitable maner through transverse slits in a vertically disposed plate 53 made of soft iron. This plate is received by an opening 54 contained within a solenoid 55. The latter may be set into a depression 56 formed in the horizontal wall portion in order rigidly to hold the coil in position.

Figure 3:
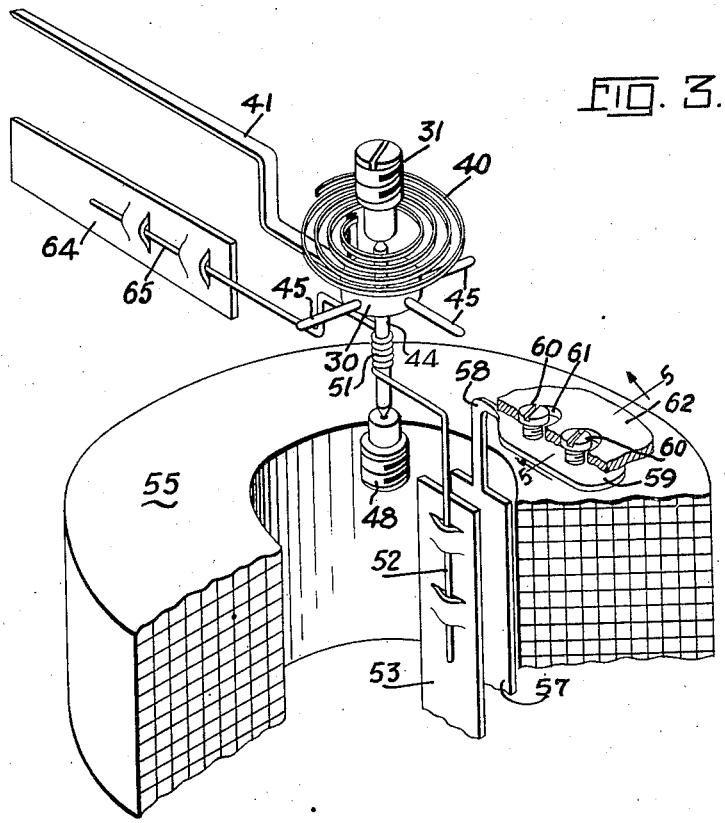
Figure 3 is a fragmentary perspective view of the actuating and actuated parts of the instrument showing in particular the improved form of pointer pivot or shaft, and also the device by which the position of the stationary vane can be readily adjusted.
Figure 4:
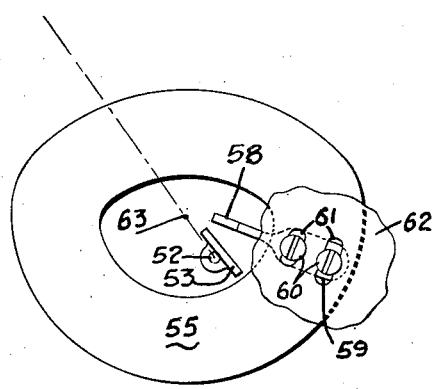
Figure 5:
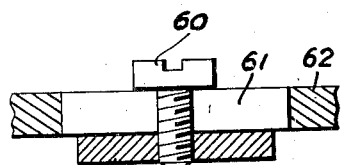
Fig. 5 is a view, somewhat enlarged, taken along line 5—5 in Fig. 3.

As shown in Figure 3 the soft iron plate 53 is arranged in parallel juxtaposition with a second soft iron plate 57 suspended from an arm 58 which merges into a flat plate 59 containing two screws 60. These screws are adapted to be received by a pair of slots 61 formed in a stationary plate 62 which may be secured to any suitable part of the casing or the coil. The arrangement is such that when the screws 60 are loosened the plate 57 may be moved toward or away from the plate 53, after which the screws can then be tightened to hold the plate in its new position. The purposes of this adjustment between the plates 53 and 57 will be explained hereinafter. It will be noted that these plates have a length practically the same as the length of the coil and that the plate 57 is so positioned as to be quite close to the inner surface of the coil. The latter takes on a somewhat flattened cylindrical or elliptical shape as can be seen in Figure 4; the lower end of the coil as shown in that figure having a truly circular shape with a center located at 63 and the upper end of the coil preferably taking the form of an ellipse.

The advantage of this irregularly shaped coil is that it tends to concentrate the magnetic lines of force at the center of the coil without destroying the circular symmetry of that portion of the coil about which the vane 53 swings.

In order to balance the swinging movement of the vane 53, particularly when the instrument is maintained in a horizontal position, a vane 64 is provided, preferably made of non-magnetic material such as aluminum and received by the segmental cavity 21 in the wall portion 18. This vane is carried on a rod 65 which joins with the upper end of the wire coil 51. It will be understood by those skilled in the art that the vane 64 performs the function of damping the movement of the lower vane 53 when the solenoid 55 is energized from a circuit, the voltage of which is to be measured.

When voltage is applied to the solenoid the vanes 53 and 57 are magnetized with the same polarity and they therefore tend to repel one another. This repulsion causes movement of the shaft 44 which carries the pointer 41. As the pointer moves over the dial plate, the torsional spring 40 is caused to tighten and, together with the damping plate 64 tends to retard the movement of the pointer. The vane 64, in effect, serves to cause a smooth and even movement of the pointer but does not affect the range of swing of the pointer as this is controlled by the amount of repulsion between the vanes 53, 57 and the tightened effect on the torsional spring. When all of these forces are properly balanced, the position that the pointer assumes over the dial plate will be an accurate indication of the voltage applied to the solenoid 55 assuming that the instrument has been properly calibrated.

The zero-set screw 39 may be turned to swing the bifurcated arm 36 slightly to the right or left, and in this way apply greater or less torsional effect on the spring 40 thereby to set the zero position of the pointer.

Whereas in the prior forms of instrument the pointer shaft 44 usually extends the entire length of the coil, it will be noted in the present structure that this shaft is extremely short on account of the fact that it is journalled within a bearing which depends from the plate 22 and extends no farther than the upper end of the solenoid. This shortness of the shaft is advantageous in that it removes all parts of the instrument movement except the actuating vane 53 from the interior of the coil, thus permitting the opening in the coil to be made smaller with greater concentration of the magnetic field. It also eliminates any tendency for obstruction to the movement of the vane 53 and in addition avoids any possibility of currents being induced within the shaft which would detract from the effect of the magnetic field produced by the solenoid.

Moreover by shortening the pointer shaft the "column effect" or weight of the shaft is materially reduced, thus relieving much of the thrust strain on the lower jewel bearing. It follows from these considerations that the improved instrument would tend to have a much greater accuracy in translating the changes of voltage applied to the solenoid into changes of movement at the pointer than those meters in which the pointer shaft extends well into the opening within the solenoid.

Another important feature of my invention is the provision by which the stationary vane 57 can be adjusted as to position with respect to the solenoid 55 and thus give a nicety of calibration of the instrument. It has been pointed out that simply loosening the screws 60 any spacing relation between the two vanes when the pointer is in its zero position may be effected and the effect of this change in position is obviously present throughout the entire swinging movement of the vane 53 with consequent accuracy of the values indicated by the pointer.

It will also be apparent that by reason of the fact that the instrument movement is entirely removed from the interior of the coil any desired shape may be given to the coil consistent with effectiveness of operation and the space available within the casing. In Figure 1 it is apparent that the recess 16 can be made much smaller than that shown in the figure, although for economy of material out of which the casing is made and also lightness of the instrument, as well as ease of manufacture thereof, it may be desirable to provide a much larger recess than is required by the actual dimensions of the coil.

It will be further evident that in as much as the entire instrument movement is carried on a single plate 22, this movement can be completely assembled on the plate and adjusted prior to inserting the movement within the casing. This offers advantages from the manufacturing, assembly and adjustment standpoints and also from the aspect of making replacements, because the entire cylindrical member 12 on which the plate 22 is mounted can be readily disassembled from the casing 1 by merely removing the screw 13.

It will be understood that I desire to comprehend within my invention such modifications as come within the scope of the claims and the invention.

Having thus fully described my invention, what I claim as new and desire to secure by Letters Patent, is:

1. An electrical measuring instrument comprising a casing containing a solenoid, an instrument movement cooperating therewith and including a shaft, a pointer secured to one end of the shaft and a magnetic actuating vane secured to the other end of the shaft, a cooperating magnetic vane within the solenoid, a support plate extending across the instrument and a bearing on one side of said plate for supporting the upper end of said shaft, and a bearing on the other side of said plate for supporting the lower end of said shaft.

2. An electrical measuring instrument comprising a casing containing a solenoid, an instrument movement cooperating therewith and including a shaft, a pointer secured to one end of the shaft and an actuating vane secured to the other end of the shaft, a cooperating magnetic vane within the solenoid, a support plate extending across the instrument and a bearing on one side of said plate for supporting the upper end of said shaft, and a bearing on the other side of said plate for supporting the lower end of said shaft, both of said bearings being positioned remote from said solenoid.

3. An electrical measuring instrument comprising a casing containing a solenoid and an instrument movement including a shaft, a pointer mounted on said shaft and a magnetic vane extending into said solenoid and secured to the shaft, a cooperating magnetic vane in juxtaposed relation with respect to the first mentioned vane and contained within said solenoid, the interior of said solenoid being devoid of any apparatus except said vanes and having a shape which is cylindrical over a distance comparable with the swing of the first mentioned vane but taking an irregular shape over the remaining portion of its interior surface.

4. An electrical measuring instrument comprising a casing containing a solenoid, an instrument movement cooperating therewith and including a shaft, a pair of vanes mounted on said shaft and disposed angularly with respect to one another, one of said vanes being magnetic and contained within the interior of the solenoid, a recess in said casing for receiving the other of said vanes, a third vane located within the solenoid and positioned adjacent the said one vane, and means for adjusting said third vane with respect to the said one vane.

5. An electrical measuring instrument comprising a casing containing a solenoid and an instrument movement including a shaft, a pointer mounted on said shaft and a magnetic vane extending into said solenoid and secured to the shaft, a cooperating magnetic vane in juxtaposed relation with respect to the first mentioned vane and contained within said solenoid, the interior of said solenoid being devoid of any apparatus except said vanes and having a shape which is cylindrical over a distance comparable with the swing of the first mentioned vane but taking an irregular shape over the remaining portion of its interior surface, and means journalling said shaft comprising axially spaced bearings positioned outside one end of said solenoid.

6. An electrical measuring instrument comprising a casing containing a solenoid and an instrument movement including a shaft, a pointer mounted on said shaft and a magnetic vane extending into said solenoid and secured to the shaft, a cooperating magnetic vane in juxtaposed relation with respect to the first mentioned vane and contained within said solenoid, the interior of said solenoid being devoid of any apparatus except said vanes and having a shape which is cylindrical over a distance comparable with the swing of the first mentioned vane but taking an irregular shape over the remaining portion of its interior surface, means journalling said shaft comprising axially spaced bearings positioned outside one end of said solenoid, and a support plate detachably secured to said casing and supporting said bearings whereby the entire movable system of said instrument can be removed as a unit.

7. An electrical measuring instrument comprising a casing containing a solenoid, an instrument movement cooperating therewith and including a shaft, a pair of vanes mounted on said shaft and disposed angularly with respect to one another, one of said vanes being magnetic and contained within the interior of the solenoid, a recess in said casing for receiving the other of said vanes, a third vane located within the solenoid adjacent the said one vane; and a support plate detachably mounted in said casing and having axially spaced bearings therein journalling said shaft whereby the movable elements in said instrument can be removed as a unit, said plate when mounted in said instrument also forming a closure for said recess.

HARRY A. ALTER.

REFERENCES CITED

The following references are of record in the file of this patent:

UNITED STATES PATENTS

| Number | Name | Date |
|---|---|---|
| 648,546 | Begole | May 1, 1900 |
| 915,257 | Wiler | Mar. 16, 1909 |
| 1,632,623 | Rich | June 14, 1927 |
| 2,170,597 | Reich | Aug. 22, 1939 |
| 2,183,685 | Lingg | Dec. 19, 1939 |

FOREIGN PATENTS

| Number | Country | Date |
|---|---|---|
| 16,794 | Great Britain | Sept. 7, 1895 |